United States Patent [19]

Iwaniuk et al.

[11] Patent Number: 5,167,603
[45] Date of Patent: Dec. 1, 1992

[54] APPARATUS FOR PROGRESSIVE BLIND BROACHING

[75] Inventors: David A. Iwaniuk, Sterling Heights; Carol L. King, Shelby Township, Macomb County, both of Mich.

[73] Assignee: National Broach & Machine Company, Mt. Clemens, Mich.

[21] Appl. No.: 817,380

[22] Filed: Jan. 6, 1992

[51] Int. Cl.$^5$ ............................................. B23Q 3/155
[52] U.S. Cl. ........................................ 483/28; 409/263
[58] Field of Search ............... 409/263, 251, 257, 269, 409/272, 273; 483/28, 29

[56] References Cited

U.S. PATENT DOCUMENTS

| | | | |
|---|---|---|---|
| 1,627,755 | 5/1927 | Urschel | 409/269 X |
| 2,280,229 | 4/1942 | Groene et al. | |
| 2,307,228 | 1/1943 | Monroe | 409/273 X |
| 2,365,040 | 12/1944 | Averill et al. | |
| 3,526,956 | 9/1970 | Fulks | 409/244 |
| 4,193,722 | 3/1980 | Bishop | 409/272 X |
| 4,401,401 | 8/1983 | Roseliep | 409/244 |
| 4,432,130 | 2/1984 | Gabriele | 409/273 X |
| 4,917,551 | 4/1990 | Roseliep | 409/244 |

FOREIGN PATENT DOCUMENTS 613877 7/1978 U.S.S.R. .
732091 5/1980 U.S.S.R. .

Primary Examiner—Z. R. Bilinsky
Attorney, Agent, or Firm—Barnes, Kisselle, Raisch Choate, Whittemore & Hulbert

[57] ABSTRACT

Apparatus for progressive blind broaching workpieces includes a machine having a table mounted for rotation about a central axis, and a ram reciprocable toward and away from the table. Work holders on the table mount the workpieces in circumferentially spaced relation around the central axis of rotation of the table. Broaching tools are mounted on a pallet which is releasably secured to the ram in proper position for broaching. A pallet load stand is positioned at one side of the machine and a pallet unload stand is positioned at the opposite side of the machine. The ram is operated by a single power cylinder.

10 Claims, 5 Drawing Sheets

APPARATUS FOR PROGRESSIVE BLIND BROACHING

This invention relates generally to broaching apparatus and refers more particularly to an apparatus for progressive blind broaching of a plurality of workpieces in a step-by-step process.

BACKGROUND AND SUMMARY

In the past, blind broaching has been carried out by a variety of different machines. In one such machine, disclosed in U.S. Pat. No. 4,917,551, the workpieces are mounted in spaced apart relation on an indexing table and broaching tools above the table mounted on rams in the same spaced apart relationship as the workpieces are individually actuated by their own separate ram cylinders.

In contrast to the above described machine, the broaching tools of this invention are carried by a single ram operated by a single power mechanism. More specifically, the broaching tools are mounted on a pallet which is releasably secured to the ram in proper position for broaching. When the broaching tools need to be replaced or sharpened, the pallet can be removed and replaced by another pallet with new or sharpened broaching tools. A pallet load-unload stand may be placed adjacent to the broaching machine for convenient and speedy loading and unloading. As an alternative, a pallet load stand may be provided at one side of the machine and a pallet unload stand may be provided at the opposite side of the machine, for even greater efficiency.

It is an object of this invention to provide apparatus for blind broaching having the above features. Another object is to provide apparatus for blind broaching which is rugged and durable, composed of a relatively few simple parts, capable of being inexpensively manufactured, and well designed for the accomplishment of its intended function.

These and other objects of the invention will become more apparent as the following description proceeds, especially when considered in conjunction with the accompanying drawings.

DETAILED DESCRIPTION OF THE INVENTION

Figure 1:
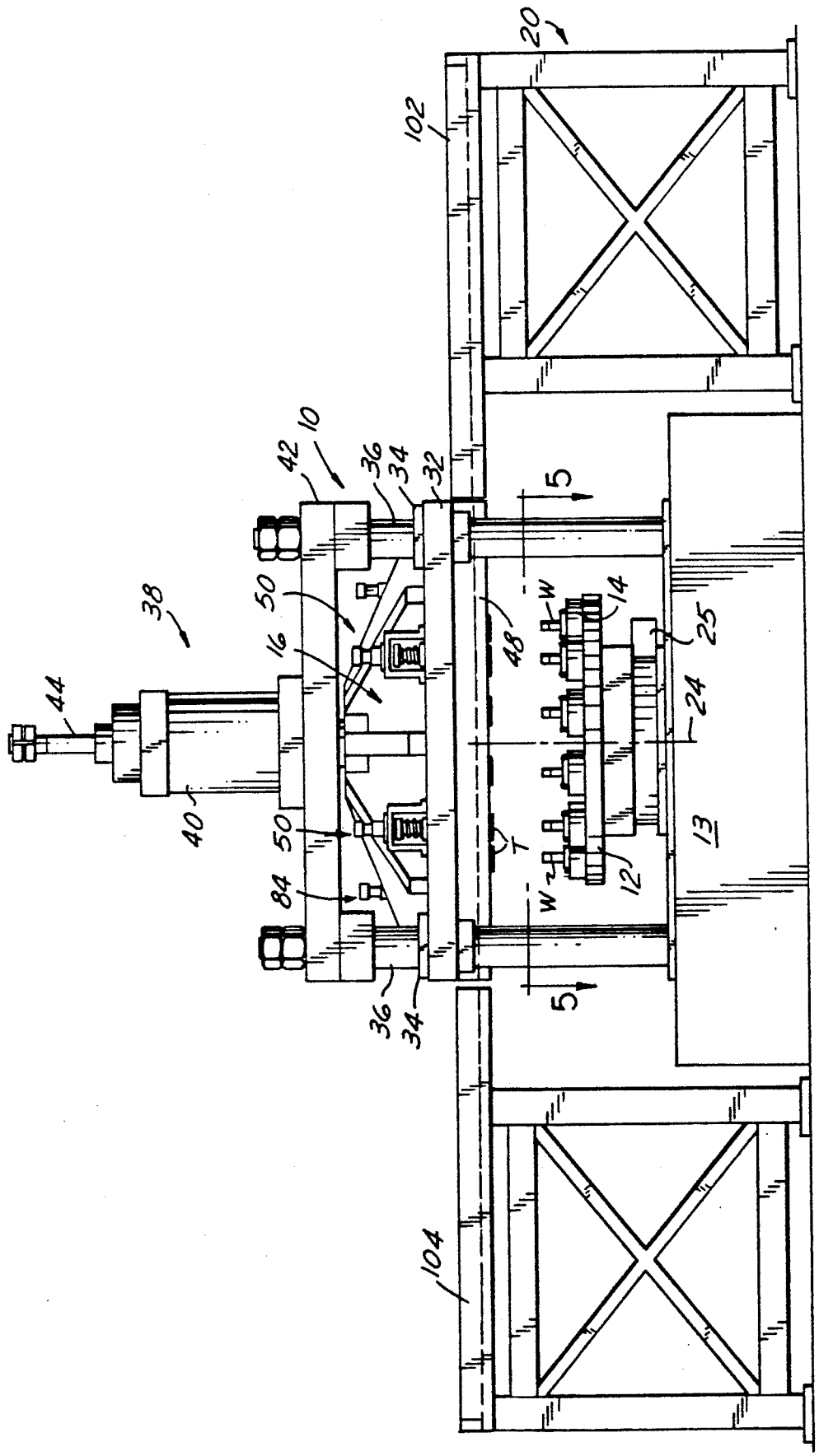
FIG. 1 is a front elevational view of a machine for progressive blind broaching constructed in accordance with the invention and showing the ram in its upper limit of travel.
Figure 2:
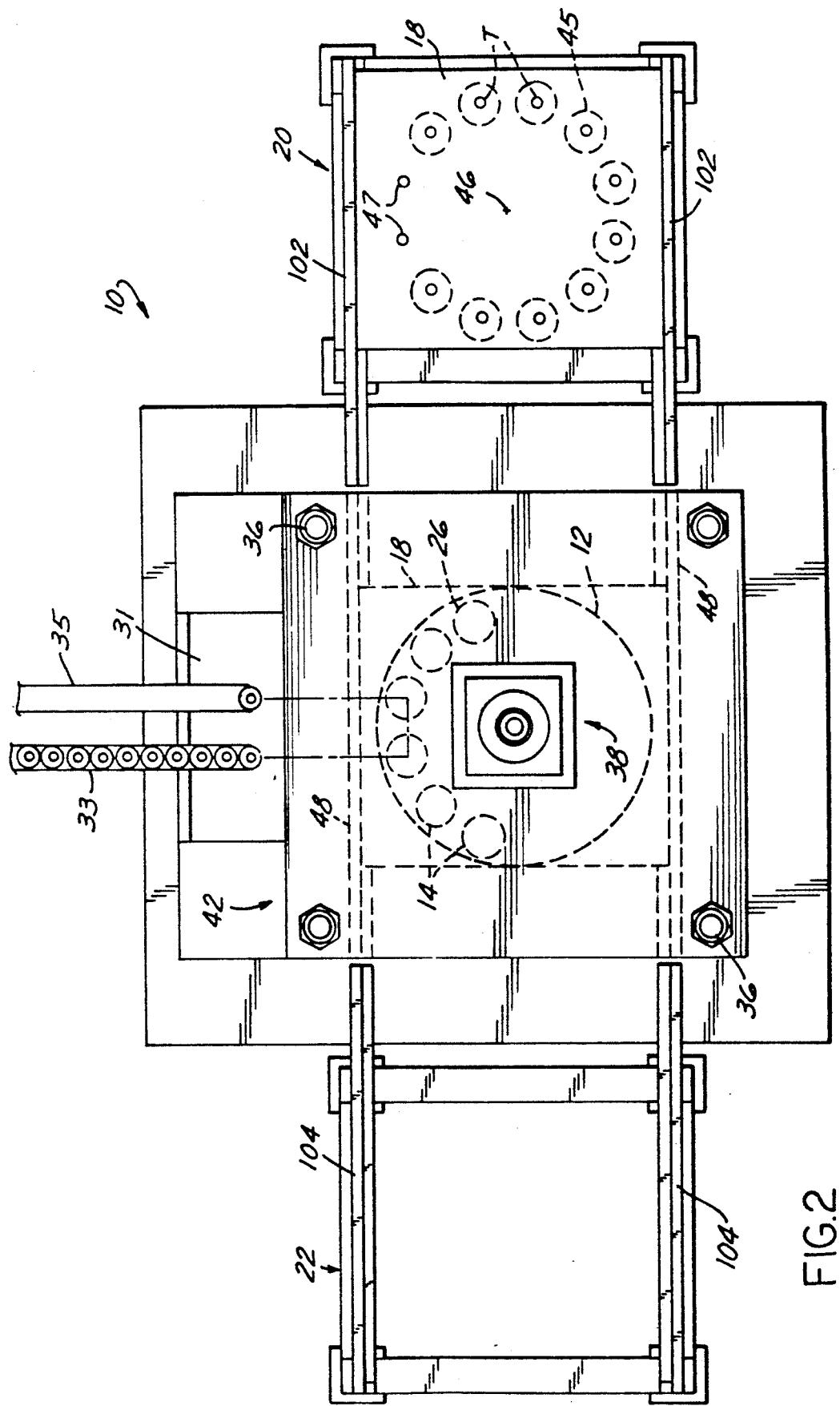
FIG. 2 is a top plan view of the machine shown in FIG. 1.

Referring now more particularly to the drawings, the broaching apparatus comprises a machine 10 having a rotatable indexing table 12 mounted on a machine base 13 and provided with a plurality of work holders 14 for mounting workpieces W, a ram 16 above the table movable toward and away from the table, a pallet 18 carried by the ram on which are mounted a plurality of broaching tools T for simultaneously progressively blind spline broaching the workpieces on the table when the ram moves downward, a pallet load stand 20 at one side of the machine 10, and a pallet unload stand 22 at the opposite side of the machine 10.

The table 12 is mounted in horizontal position on the base 13 for rotation about a central vertical axis 24. The table is rotated in a step-by-step operation by a conventional index drive in the machine base powered by a motor 25. On the top surface of the table in a circle concentric with the central axis of rotation 24 are a plurality of equally circumferentially spaced apart stations 26 where the work holders 14 are affixed. Each work holder is adapted to mount a workpiece to be broached. The workpieces are securely clamped to the work holders in a conventional manner as by releasable radial jaws 30.

The work holders are loaded and unloaded at a workpiece load-unload station 31. A workpiece in chute 33 leads to the station 31 and an out chute 35 leads from the station 31.

The ram 16 is preferably a reinforced steel weldment having a horizontal bottom plate 32. The bottom ram plate is horizontal and has bearing sleeves 34 which are slidable on four vertical guide columns 36 extending upwardly from the base, thereby supporting the ram for vertical reciprocation toward and away from the table.

Figure 3:
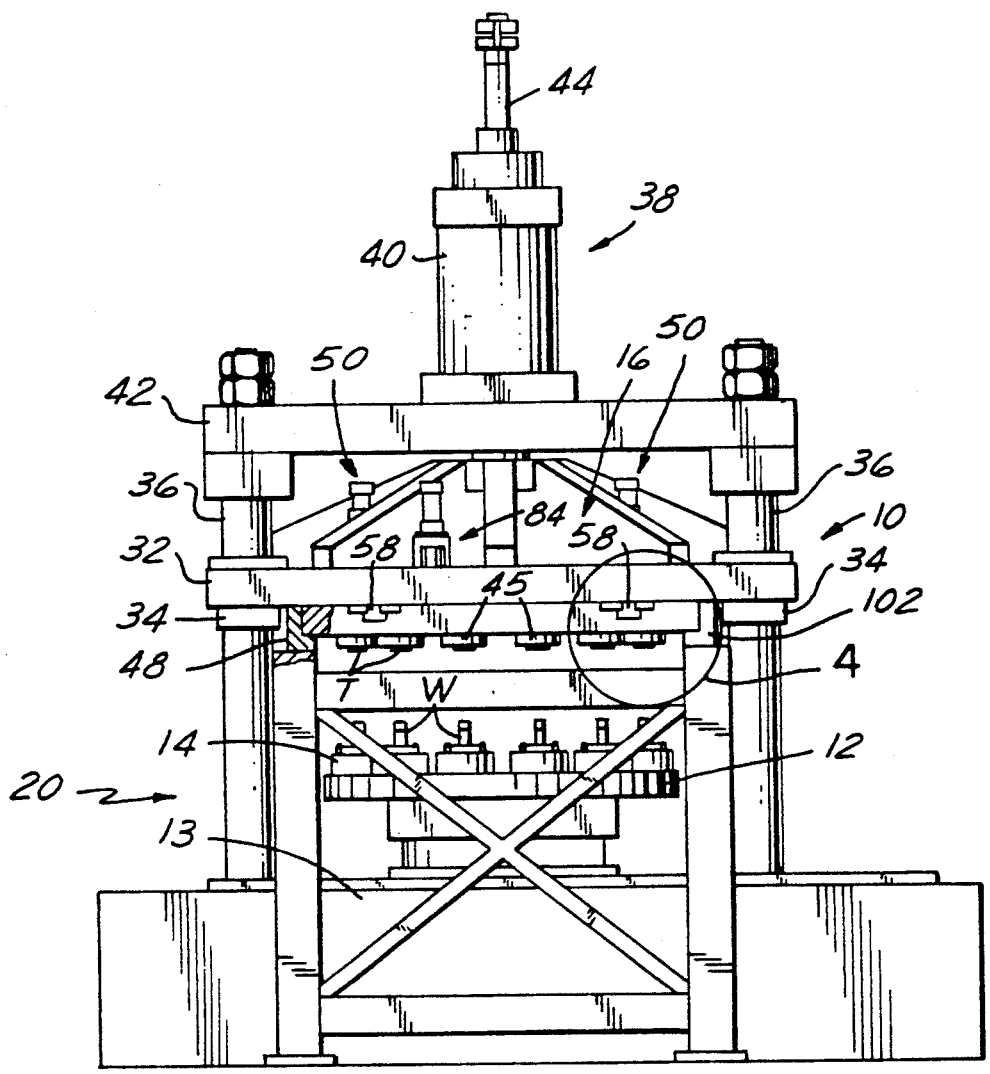
FIG. 3 is a side view.
Figure 4:
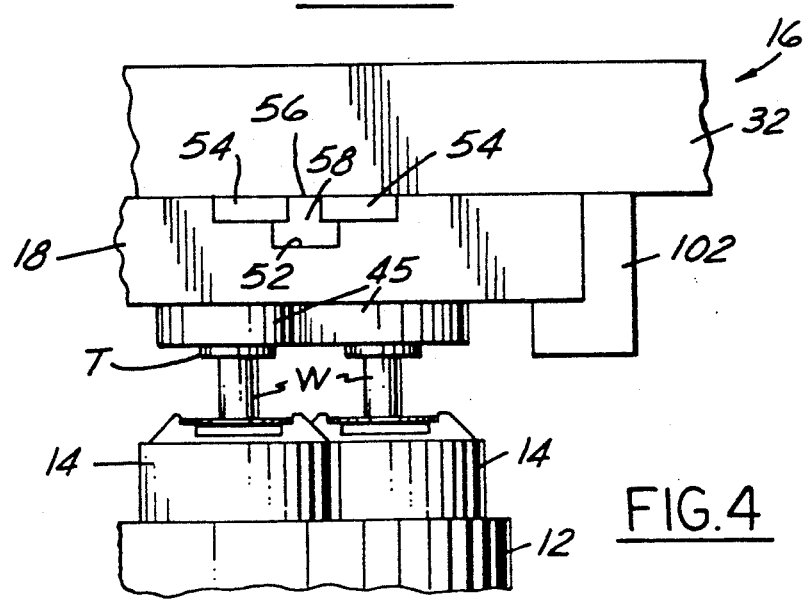
FIG. 4 is an enlargement of the portion of FIG. 3 within the circle 4, but with the ram in its lower limit of travel.
Figure 5:
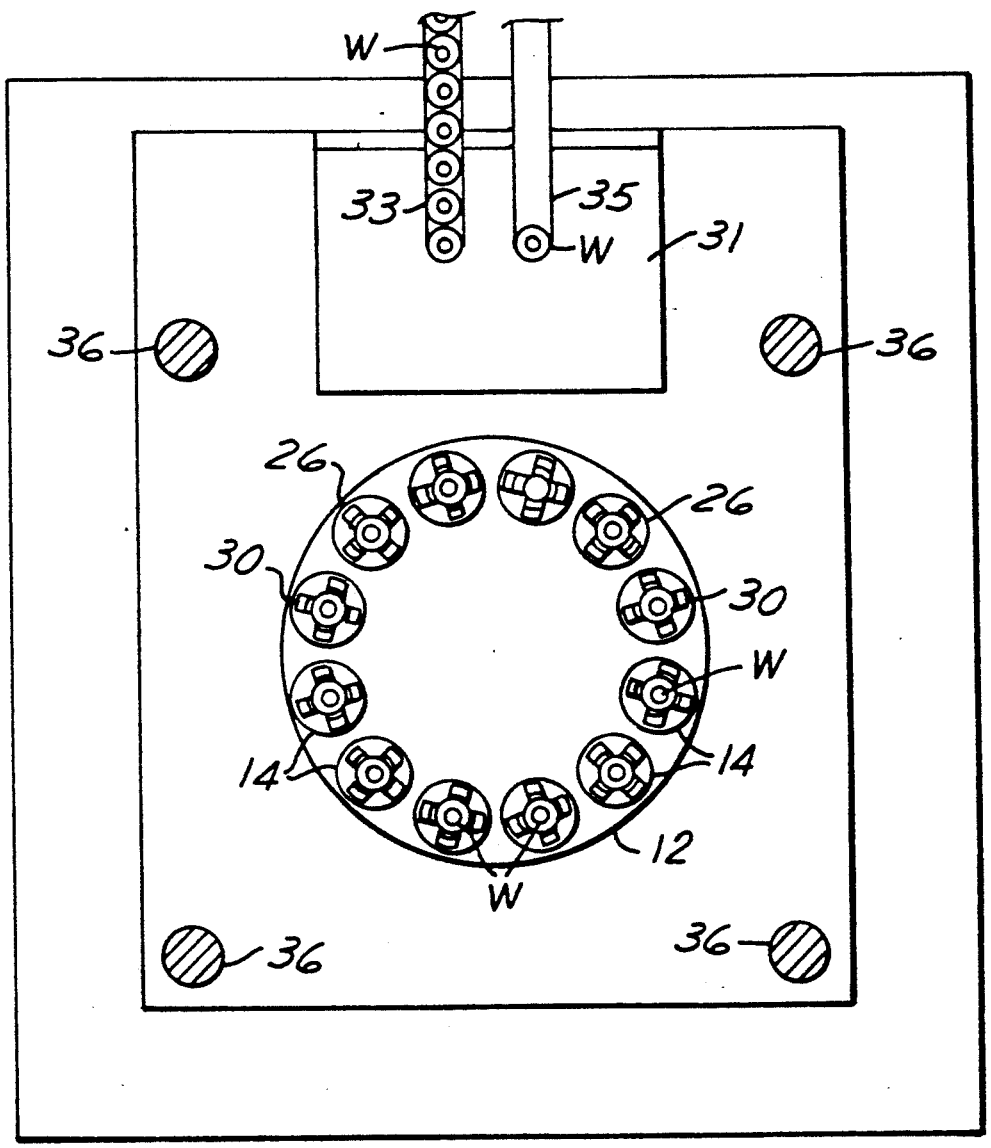
FIG. 5 is a sectional view taken on the line 5—5 in FIG. 1.

The ram is reciprocated vertically by a single piston-cylinder assembly 38 having a vertical cylinder 40 mounted on a top plate 42 secured to the tops of the columns. A piston (not shown) within the cylinder has a piston rod 44 connected to the ram. The piston-cylinder assembly is reversible and can raise and lower the ram between the upper limiting position shown in FIGS. 1 and 3 and the lower limiting position shown in FIG. 4.

The pallet 18 is preferably a rectangular plate of one piece steel construction having broach tool holders 45 for supporting the broaching tools T. The broach tool holders 45 are mounted on the bottom surface of the pallet at stations arranged in a circle around the center 46 of the circle in circumferentially spaced apart relation corresponding to the spacing and placement of the workpiece holders 14 on the table. The two stations 47 in the circle at the workpiece load-unload station 31 are blank, that is they do not have tool holders, because there is no broaching at that location.

The pallet is held on the bottom of the ram plate in identical, elongated, horizontal, parallel L-shaped guides 48. These guides are open-ended providing entrance and exit access openings permitting a pallet to be inserted into or removed from the guides from either end. When the pallet is clamped in proper position in the guides, the center 46 of the circle of tools T is on the axis of rotation 24 of the table and the broaching tools T are located directly above and in register with the respective work holders 14 on which the workpieces to be broached are mounted.

The pallet 18 is clamped in operative position beneath the ram plate 32 preferably by four clamping mechanisms 50. For this purpose, the pallet 18 has the two laterally spaced, parallel horizontal grooves or channels 52 milled in its top surface, each partially closed by parallel strips 54 to define elongated parallel T-shaped, open-ended slots 56. These slots receive elongated T-shaped clamp bars 58 which are carried on the bottom surface of the ram plate 32. When the pallet is slid into the guides 48 on the bottom surface of the ram plate, the clamp bars 58 enter the pallet slots 56. When the pallet is in its correct operative position with respect to the ram plate, it is clamped in that position in the manner which now will be described.

Figure 7:
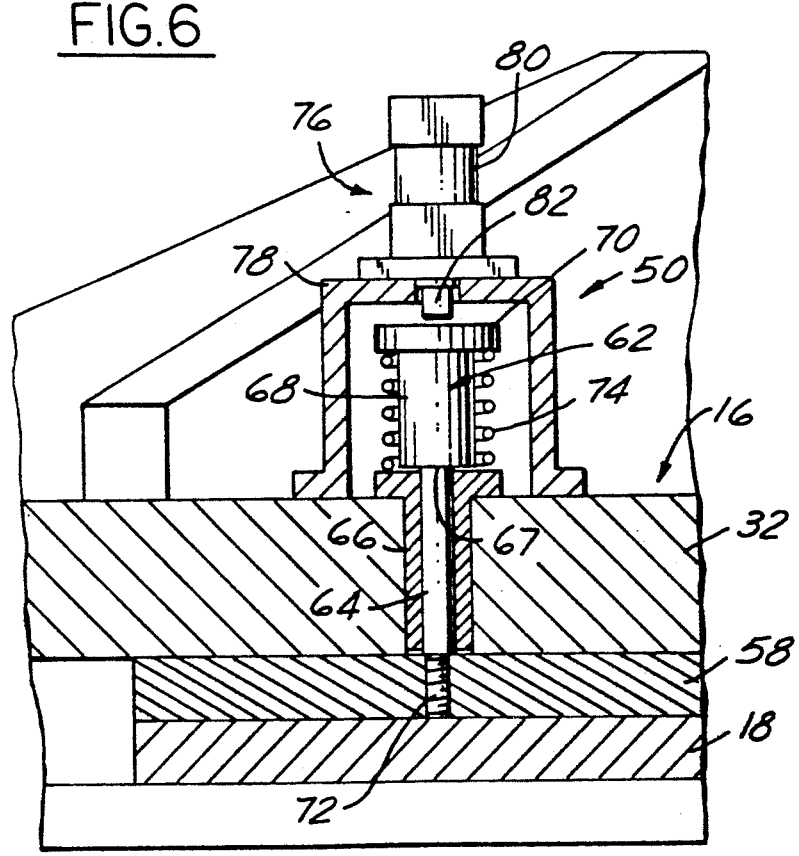
FIG. 7 is an enlarged fragmentary sectional view of the means for clamping the pallet to the ram.

One and preferably two clamping mechanisms 50 are provided for each clamp bar 58. Referring to FIG. 7, each clamping mechanism 50 includes a clamp actuator 62 which is in the form of a plunger having a reduced lower end portion 64 slidably received in a guide bushing 66 extending vertically through the ram plate 32. The actuator has an enlarged upper portion 68 and a head 70. A threaded extension 72 on the lower end of the reduced portion 64 threadably engages one of the pallet clamp bars 58. A compression coil spring 74 surrounds the enlarged portion 68 of the clamp actuator and is compressed between the head 70 of the actuator and the top of the guide bushing 66, normally elevating the clamp actuator and drawing the clamp bar 58 and pallet 18 into frictional engagement with the under-surface of the ram plate 32, thus holding the pallet in fixed position with respect to ram plate. In this condition, there is a slight clearance between the top on the guide bushing 66 and the shoulder 67 separating the reduced and enlarged portions 64 and 68 of the clamp actuator.

A hydraulic piston-cylinder assembly 76 is provided for unclamping the pallet. The piston-cylinder assembly 76 is mounted above the clamp actuator on a support bracket 78. A piston (not shown) within the cylinder 80 of piston-cylinder assembly 76 has a piston rod 82 projecting downwardly through the support bracket 78 and terminating above the head 70 of the clamp actuator. When the hydraulic cylinder assembly is actuated, the piston rod 82 is projected downwardly into contact with the head of the actuator, pressing the actuator downwardly against the action of the spring 74 and causing the shoulder 67 of the actuator to engage the top of the guide bushing 66. This lowers the pallet 18 and pallet clamp bars 58 enough that they drop out of frictional contact with the bottom surface of the ram plate 32, thus unclamping the pallet.

Figure 6:
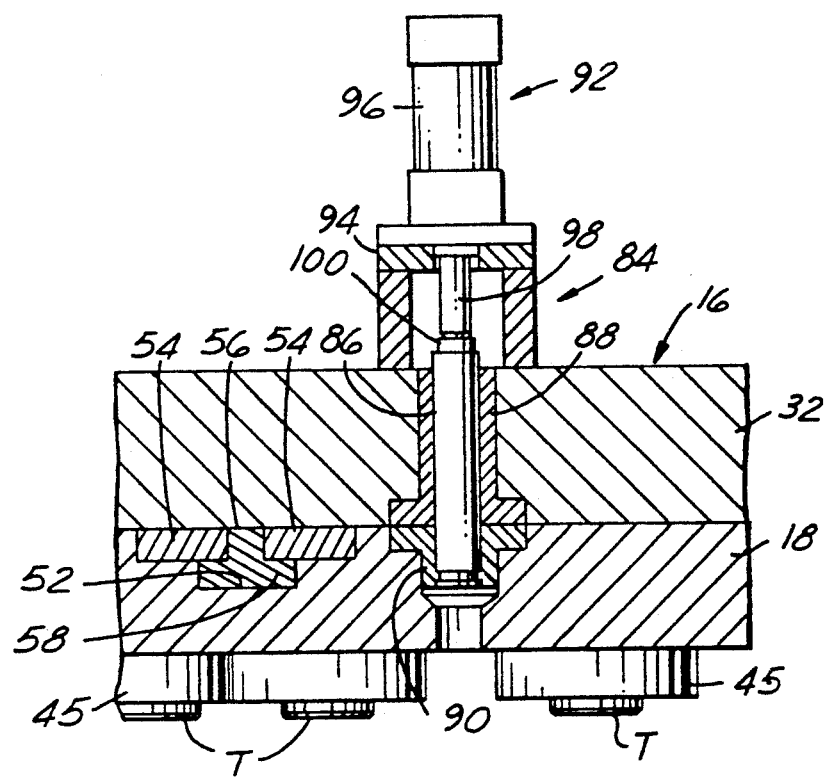
FIG. 6 is an enlarged fragmentary sectional view showing the means for locating a pallet relative to the ram.

Prior to operating the clamping mechanisms 50, it is necessary to locate the pallet in proper operating position so that the broaching tools T are directly above and in register with the work holders 14. For this purpose, one and preferably two locating mechanisms 84 are provided. The locating mechanisms 84 are asymmetrically arranged so that the pallet may not accidently be turned end for end and wrongly inserted in the guides 48. The locating mechanisms each comprise a locating plunger 86 vertically slidable in a guide bushing 88 in the ram plate 32. A guide bushing 90 for each locating mechanism 84 is also provided in the pallet. When the bushings 88 and 90 are aligned, the locating plunger is projected downwardly to the position shown in FIG. 6 so that it extends into the bushing 90 to properly locate the pallet.

The locating plunger 86 is raised and lowered by a reversible hydraulic piston-cylinder assembly 92 mounted above the locating plunger on a support bracket 94. A piston (not shown) in the cylinder 96 of the cylinder assembly has a piston rod 98 which extends vertically beneath the cylinder and is secured to the locating plunger 86 by means including a lock nut 100.

When the piston rod is elevated, the locating plunger is withdrawn from the bushing 90 in the pallet, and when it is extended it extends down into the bushing 90 to properly position the pallet with respect to the ram. After the pallet is located, it may be clamped into position by the clamping mechanisms 50 as previously described.

The load stand 20 at one side of the machine has a pair of elongated, horizontal parallel, L-shaped pallet guides 102 spaced apart the same distance as the pallet guides on the ram plate. These guides are open at the end adjacent to the machine and together are capable of slidably supporting a pallet. When the ram is in its upper limiting position shown in FIGS. 1 and 3, the L-shaped guides 48 on the ram plate are respectively aligned with the L-shaped guides 102 on the stand, so that a pallet on the guides of the stand may be slid directly to the guides on the ram plate.

The unload stand 22 on the opposite side of the machine is identical to the load stand and has a pair of elongated, horizontal, parallel L-shaped guides 104 which are respectively aligned with the guides 102 on the load stand. Hence the guides on the unload stand are aligned with the guides 48 on the ram plate 32 when the ram is in its upper limiting position, so that a pallet on the ram may be slid directly from the guides 48 of the ram plate to the guides 104 of the unload stand.

It will be understood that it is possible to eliminate one of the stands and operate the remaining stand for both loading and unloading purposes, such remaining stand thus becoming a load-unload stand.

In operation, broach tools T are mounted in the broach tool holders 45 on the bottom side of the pallet 18. To accomplish this, the pallet must first be removed from the machine 10. Each broaching tool T has a different timing pin location in the step-by-step indexing of the table to insure that the proper tool will be in the proper tool holder. After the broaching tools are mounted, the pallet 18 is installed in the guides 48 of the ram and properly located and clamped.

At the load-unload station 31, a workpiece from in chute 33 will be secured in a workpiece holder 14 on the table, while simultaneously a finished workpiece will be removed from an adjacent work holder. The indexing table will then be indexed one position and then the ram 16 will be advanced downwardly bringing a broaching tool into contact with the workpiece. After the ram reaches its lower limit of travel, it will be retracted up and away from the workpiece. The indexing table is then indexed to the next index position which will move the workpiece in line with the next broaching tool. The ram will then advance downwardly bringing the next broaching tool into contact with the workpiece. This broach and index procedure will continue until the workpiece has been broached by the last broaching tool. The next index of the table will position the workpiece at the load-unload station 31 where it will be removed and placed in the out chute 35. This broaching sequence is simultaneously taking place at each of the workpiece holders on the indexing table. In other words, between indexing of the table one workpiece is being placed in a workpiece holder on the table while a finished workpiece is being removed. As a result, a finished workpiece will be delivered to the load-unload station 31 at each index of the indexing table.

When the machine is equipped with only one load-unload stand 20 or 22, the pallet 18 which is in the ram may be moved from the ram onto the stand when the ram is in the up position. By the use of a conventional overhead crane or hoist, the pallet may be removed from the stand and taken to the tool change area where the dull broach tools may be either replaced or sharpened. If there are two or more pallets in use, a new pallet may be placed on the load-unload stand and then moved into the machine so that the broaching operation may continue while the previously removed pallet is taken away to have its broaching tools either sharpened or replaced.

For machines equipped with both a load stand 20 and an unload stand 22, one pallet may be operating in the machine while a second pallet is waiting in a stand-by condition on the load stand. When the pallet in the ram is removed to the unload stand for replacement or sharpening of the broach tools, the second pallet may be moved into position on the machine ram. The unloaded pallet may be then removed for replacing or resharpening the broach tools while the second pallet is in place on the ram so that the broaching operating may continue without serious interruption.

What is claimed is:

1. Apparatus for the progressive blind broaching of a plurality of workpieces comprising a base, an indexing table having a central axis and mounted on said base for rotation about said central axis, workpiece holders on said table for mounting said workpieces in circumferentially spaced relation about said central axis, means for indexing said table around said central axis in a step-by-step motion, a ram, a tool pallet, means mounting a plurality of broaching tools on said pallet in a circular arrangement about a center point in circumferentially spaced relation corresponding to the spacing of said workpiece holders, releasable means for removably securing said pallet to said ram in an operative position such that the center point of said broaching tools lies on the central axis of said table, said releasable means comprising locating mechanism for accurately locating said pallet, and clamping mechanism for clamping said pallet to the ram after it is accurately located by said locating mechanism, support means supporting said ram for movement toward and away from said table, and power mechanism for moving said ram along said support means toward and away from said table at intervals between the intermittent indexing of said table, whereby said tools perform a simultaneous metal removal cut on workpieces mounting on said work holders.

2. Apparatus as defined in claim 1, wherein said power mechanism comprises a single drive unit operatively connected to said ram.

3. Apparatus for the progressive blind broaching of a plurality of workpieces comprising a base, and indexing table having a central axis and mounted on said base for rotation about said central axis, workpiece holders on said table for mounting said workpieces in circumferentially spaced relation about said central axis, means for indexing said table around said central axis in a step-by-step motion, a ram, a tool pallet, means mounting a plurality of broaching tools on said pallet in a circular arrangement about a center point in circumferentially spaced relation corresponding to the spacing of said workpiece holders, releasable means for removably securing said pallet to said ram in an operative position such that the center point of said broaching tools lies on the central axis of said table, support means supporting said ram for movement toward and away from said table, and power mechanism for moving said ram along said support means toward and away from said table at intervals between the intermittent indexing of said table, whereby said tools perform a simultaneous metal removal cut on workpieces mounted on said work holders, said ram having guide means for slidably receiving said pallet, and an access opening to said guide means through which said pallet may be slidably introduced into said guide means and slid to said operative position and slidably removed from said guide means.

4. Apparatus defined in claim 3, and further comprising a pallet load-unload stand adapted to support said pallet, said load-unload stand being disposed adjacent to said access opening to said guide means to enable the convenient transfer of said pallet from said load-unload stand to said ram and vica versa.

5. Apparatus as defined in claim 4, wherein said load-unload stand has second guide means aligned with said first-mentioned guide means on said ram to enable said pallet to be slid directly from said second guide means to said first-mentioned guide means and vice versa when said ram is in a predetermined position along said support means.

6. Apparatus for the progressive blind broaching of a plurality of workpieces comprising a base, an indexing table having a central axis and mounted on said base for rotation about said central axis, workpiece holders on said table for mounting said workpieces in circumferentially spaced relation about said central axis, means for indexing said table around said central axis in a step-by-step motion, a ram, a tool pallet, means mounting a plurality of broaching tools on said pallet in a circular arrangement about a center point in circumferentially spaced relation corresponding to the spacing of said workpiece holders, releasable means for removably securing said pallet to said ram in an operative position such that the center point of said broaching tools lies on the central axis of said table, support means supporting said ram for movement toward and away from said table, and power mechanism for moving said ram along said support means toward and away from said table at intervals between the intermittent indexing of said table, whereby said tools perform a simultaneous metal removal cut on workpieces mounted on said work holders, said ram having guide means for slidably receiving said pallet, an entrance to said guide means through which said pallet may be slidably introduced into said guide means and slid to said operative position, and an exit from said guide means through said pallet may be slidably removed from said guide means.

7. Apparatus as defined in claim 6, and further comprising a load stand adapted to support a pallet and positioned adjacent to said entrance to said guide means to enable the convenient transfer of a pallet from said load stand to said ram, and an unload stand adapted to support a pallet and positioned adjacent to said exit from said guide means to enable the convenient transfer of a pallet from said ram to said unload stand.

8. Apparatus as defined in claim 7, wherein said load stand has second guide means aligned with said first-mentioned guide means to enable said pallet to be slid directly from said second guide means to said first-mentioned guide means when said ram is in a predetermined position along said support means, and said unload stand has third guide means aligned with said first-mentioned guide means on said ram to enable said pallet to be slid directly from said first-mentioned guide means to said third guide means when said ram is in a predetermined position along said support means.

9. Apparatus as defined in claim 8, wherein said power mechanism comprises a single piston-cylinder assembly operatively connected to said ram.

10. Apparatus as defined in claim 9, wherein said releasable means for securing said pallet to said ram comprises a locator for accurately locating said pallet, and a clamp for clamping said pallet to the ram after it is accurately located by said locator.

* * * * *